(12) United States Patent
Gidcumb et al.

(10) Patent No.: US 8,343,631 B2
(45) Date of Patent: Jan. 1, 2013

(54) LOW-GLOSS, TWO-COMPONENT CLEAR COATS, ARTICLES OF MANUFACTURE HAVING LOW-GLOSS, TWO-COMPONENT CLEAR COATS, AND METHODS FOR APPLYING THE SAME

(75) Inventors: Yuko Nagata Gidcumb, Canton, MI (US); Scott Dale Kubish, Saline, MI (US); Richard Raabe, Medina, OH (US)

(73) Assignees: Toyota Motor Engineering & Manufacturing North America, Inc., Erlanger, KY (US); PPG Industries Ohio, Inc., Cleveland, OH (US); Kansai Paint Company, Ltd., Hyogo-Kan (JP)

( * ) Notice: Subject to any disclaimer, the term of this patent is extended or adjusted under 35 U.S.C. 154(b) by 48 days.

(21) Appl. No.: 12/938,652

(22) Filed: Nov. 3, 2010

(65) Prior Publication Data

US 2012/0107618 A1 May 3, 2012

(51) Int. Cl.
*B32B 27/40* (2006.01)
*C09D 175/04* (2006.01)
*B05D 3/10* (2006.01)

(52) U.S. Cl. .............. 428/423.1; 427/385.5; 524/500; 524/507

(58) Field of Classification Search ............. 427/385.5; 524/500, 507; 428/423.1
See application file for complete search history.

(56) References Cited

U.S. PATENT DOCUMENTS

| | | | | |
|---|---|---|---|---|
| 3,311,527 A | * | 3/1967 | Urbanic et al. | 428/90 |
| 5,318,619 A | * | 6/1994 | Lynch et al. | 523/171 |
| 5,750,234 A | | 5/1998 | Johnson et al. | |
| 6,730,740 B1 | | 5/2004 | Mestach et al. | |
| 2002/0026006 A1 | | 2/2002 | Garcia et al. | |
| 2002/0111421 A1 | | 8/2002 | Van Rooyen | |
| 2003/0108757 A1 | | 6/2003 | Hovatter et al. | |
| 2003/0211334 A1 | | 11/2003 | Jones | |
| 2007/0082211 A1 | | 4/2007 | Hazan et al. | |
| 2009/0012226 A1 | | 1/2009 | Coogan et al. | |
| 2012/0058345 A1 | * | 3/2012 | Gidcumb et al. | 428/412 |

* cited by examiner

*Primary Examiner* — Thao T. Tran
(74) *Attorney, Agent, or Firm* — Dinsmore & Shohl LLP

(57) ABSTRACT

Low-gloss, two-component clear coats include a base resin including a urethane resin, an isocyanate resin that combines with the base resin immediately prior to application of the low-gloss, two-component clear coat to form a two-component base resin mixture, wherein the two-component base resin mixture comprises from about 20 weight percent to about 40 weight percent urethane resin and from about 20 weight percent to about 40 weight percent isocyanate resin, and a silica-based flattener, wherein the silica-based flattener comprises from about 5 parts by weight per 100 parts by weight of the two-component base resin mixture to about 20 parts by weight per 100 parts by weight of the two-component base resin mixture, wherein the low-gloss, two-component clear coat has a 60° gloss finish from 22 gloss units to 34 gloss units when cured.

16 Claims, 2 Drawing Sheets

LOW-GLOSS, TWO-COMPONENT CLEAR COATS, ARTICLES OF MANUFACTURE HAVING LOW-GLOSS, TWO-COMPONENT CLEAR COATS, AND METHODS FOR APPLYING THE SAME

TECHNICAL FIELD

The present specification generally relates to clear coat paints and, more specifically, to low-gloss, two-component clear coats.

BACKGROUND

Paints can possess numerous visual and physical characteristics such as color, gloss, weatherability, durability and other traits that may influence their service life and suitability for particular applications. To obtain the necessary properties, paint for vehicles can comprise either a monocoat system, where a basecoat is applied on top of a primer, or a two coat system, where an additional clear coat is applied on top of the basecoat. While monocoat systems can provide a low-gloss appearance for a vehicle surface, the low-gloss finish can be limited to black color paints which tend to have inferior weathering performance. The clear coats provided in two coat systems improve the weathering performance of a painted surface and can be applied to any color paint. However, clear coats can be limited to high gloss finishes. Thus, it may be advantageous to provide a two-component clear coat for a two coat system that provides a low-gloss finish.

Accordingly, a need exists for alternative low-gloss, two-component clear coats for two coat systems.

SUMMARY

In one embodiment, a low-gloss, two-component clear coat includes a base resin including a urethane resin, an isocyanate resin that combines with the base resin immediately prior to application of the low-gloss, two-component clear coat to form a two-component base resin mixture, wherein the two-component base resin mixture includes from about 20 weight percent to about 40 weight percent urethane resin and from about 20 weight percent to about 40 weight percent isocyanate resin, and a silica-based flattener, wherein the silica-based flattener includes from about 5 parts by weight per 100 parts by weight of the two-component base resin mixture to about 20 parts by weight per 100 parts by weight of the two-component base resin mixture, wherein the low-gloss, two-component clear coat has a 60° gloss finish from 22 gloss units to 34 gloss units when cured.

In another embodiment, an article of manufacture having a low-gloss, two-component clear coat is provided. The article of manufacture may include an article of manufacture surface and a low-gloss, two-component clear coat applied over the article of manufacture surface. The low-gloss, two-component clear coat can include a base resin including a urethane resin, an isocyanate resin that combines with the base resin immediately prior to application of the low-gloss, two-component clear coat to form a two-component base resin mixture, wherein the two-component base resin mixture includes from about 20 weight percent to about 40 weight percent urethane resin and from about 20 weight percent to about 40 weight percent isocyanate resin, and a silica-based flattener, wherein the silica-based flattener includes from about 5 parts by weight per 100 parts by weight of the two-component base resin mixture to about 20 parts by weight per 100 parts by weight of the two-component base resin mixture, wherein the low-gloss, two-component clear coat has a 60° gloss finish from 22 gloss units to 34 gloss units when cured.

In yet another embodiment, a method for applying a low-gloss, two coat paint system, is provided. The method may include applying a basecoat to a vehicle part, curing the basecoat on the vehicle part, and applying a low-gloss, two-component clear coat to the basecoat. The low-gloss, two-component clear coat may include a base resin including a urethane resin, an isocyanate resin that combines with the base resin immediately prior to application of the low-gloss, two-component clear coat to form a two-component base resin mixture, wherein the two-component base resin mixture includes from about 20 weight percent to about 40 weight percent urethane resin and from about 20 weight percent to about 40 weight percent isocyanate resin, and a silica-based flattener including from about 5 parts by weight per 100 parts by weight of the two-component base resin mixture to about 20 parts by weight per 100 parts by weight of the two-component base resin mixture. The method may further include curing the low-gloss, two-component clear coat on the basecoat surface of the basecoat, wherein the low-gloss, two-component clear coat comprises a 60° gloss finish of 22 units to 34 units after curing.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
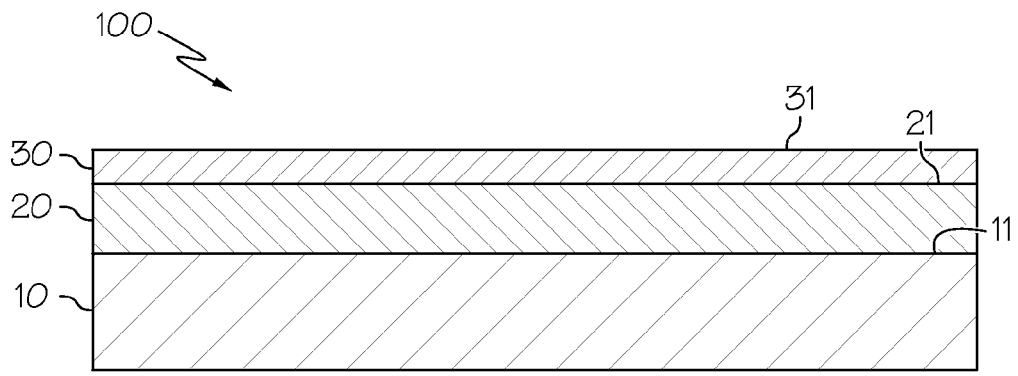
FIG. 1 schematically depicts a cross-sectional view of a low-gloss, two coat paint system according to one or more embodiments shown and described herein.

FIG. 1 generally depicts a cross-sectional view of a low-gloss, two coat paint system on a vehicle part. The low-gloss, two coat paint system generally comprises a basecoat covering the surface of the vehicle part and a low-gloss, two-component clear coat covering the basecoat. The low-gloss, two-component clear coat can comprise a silica-based flattener and a two-component base resin mixture, wherein the two-component base resin mixture comprises an isocyanate resin and a base resin comprising a urethane resin. The low-gloss, two-component clear coat provides increased weatherability to the low-gloss, two coat paint system while also providing a low-gloss appearance to a variety of basecoats. Low-gloss, two-component clear coats, articles of manufacture with a low-gloss, two-component clear coats, and methods for applying low-gloss, two coat paint systems will be described in more detail herein.

Figure 3:
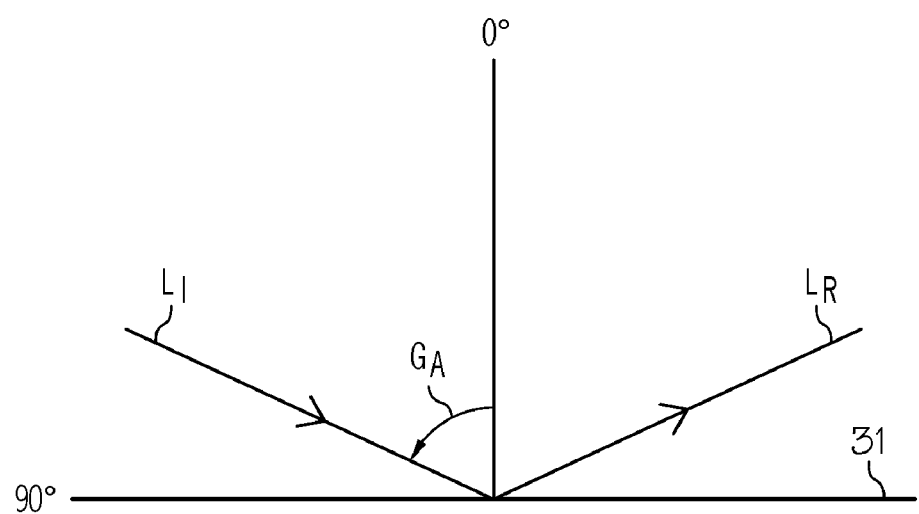
FIG. 3 schematically depicts measuring the low-gloss, two-component clear coat surface according to one or more embodiments shown and described herein.

Referring to FIG. 1, a low-gloss, two coat paint system 100 is illustrated as applied to a vehicle part 10. The low-gloss, two coat paint system 100 generally comprises a basecoat 20 and a low-gloss, two-component clear coat 30 which protects the basecoat 20 from weathering, abrasion, and/or other environmental conditions while also providing a low-gloss finish. The low-gloss, two-component clear coat 30 comprises a two-component base resin mixture and a silica-based flattener to provide a 60° gloss finish of 22 gloss units to 34 gloss units when cured. As used herein, the phrase "60° gloss finish" refers to the intensity of light reflected from the low-gloss, two-component clear coat surface 31 at a 60° angle of reflection when cured. For example, FIG. 3 schematically illustrates an exemplary measurement of the gloss finish of a low-gloss, two-component clear coat surface 31. As illustrated, an incident light $L_I$ is applied to the low-gloss, two-component clear coat surface 31 such that reflected light $L_R$ is reflected off the surface, wherein the intensity of the reflected light $L_R$ is less than the intensity of the incident light $L_I$. The gloss angle $G_A$ is determined as the angle between the incident light $L_I$ and the normal to the low-gloss, two-component clear coat surface 31. Incident light $L_I$ coming from a gloss angle $G_A$ normal to the low-gloss, two-component clear coat surface 31 would possess a gloss angle $G_A$ of approximately 0°. Conversely, incident light $L_I$ coming from a gloss angle $G_A$ parallel with the low-gloss, two-component clear coat surface 31 would possess a gloss angle $G_A$ of approximately 90°. As used herein, the measurement for a "60° gloss finish" is ascertained from incident light $L_I$ with a 60° gloss angle $G_A$. The reflected light $L_R$ can be measured in terms of gloss units with a commercially available gloss meter such as the Novo Gloss LITE 60° Gloss Meter or the BYK Gardner 60° Gloss Meter.

In one embodiment described herein, the two-component base resin mixture of the low-gloss, two-component clear coat 30 comprises a base resin and an isocyanate resin. The base resin comprises a urethane resin, such as a saturated linear polyester urethane. The urethane resin also acts as a carrier for the silica-based flattener as will become appreciated herein. Specifically, the use of urethane resin in the two-component base resin reduces or prevents the need to provide additional dispersants and/or cross linkers into the two-component base resin mixture to support the silica-based flattener. In one embodiment, the base resin further comprises additional polymeric resins or a combination of polymeric resins. For example, in addition to the urethane resin, the base resin can comprise polyester resins, acrylic resins, methacrylate resins, alkyd resins, polycarbonate resins and/or any other similar polymeric resins. In one exemplary embodiment, the base resin can further comprise an acrylic polymer resin comprising acrylate and methacrylate monomers. The base resin and its individual components can further comprise any weight percent of the overall two-component base resin mixture such that the low-gloss, two-component clear coat 30 has a 60° gloss finish of 22 gloss units to 34 gloss units when cured. For example, in one embodiment, the urethane resin in the base resin of the two-component base resin mixture comprises from about 20 weight percent to about 40 weight percent of the two-component base resin mixture. In another embodiment, the urethane resin comprises from 25 weight percent to 30 weight percent of the two-component base resin mixture. In yet another embodiment, the urethane resin comprises about 27.8 weight percent of the two-component base resin mixture.

The two-component base resin mixture of the low-gloss, two-component clear coat 30 further comprises an isocyanate resin that combines with the base resin prior to application of the low-gloss two-component clear coat 30 to form the two-component base resin mixture. The isocyanate resin is combined with the base resin (comprising the urethane resin) prior to application on a surface to facilitate a consistent low-gloss, two-component clear coat 30 with substantially uniform dispersion of the silica-based flattener while also providing curability as it is applied such that the low-gloss, two-component clear coat 30 becomes fixed to the surface after curing. In one embodiment, the isocyanate resin is combined with the two-component base resin immediately prior to the application of the low-gloss, two-component clear coat 30 to a surface. As used herein, "immediately prior" means mixing within 1 minute before application, such as by mixing the isocyanate resin and the base resin within a paint spray gun or just before it reaches the paint spray gun as it is being applied to a surface. Mixing immediately prior to application prevents premature curing and assists in the uniform application of the low-gloss, two-component clear coat. The isocyanate resin can comprise any weight percent of the overall two-component base resin mixture such that the low-gloss, two-component clear coat 30 has a 60° gloss finish of 22 gloss units to 34 gloss units when cured. In one embodiment, the isocyanate resin comprises from about 20 weight percent to about 40 weight percent of the two-component base resin mixture. In another embodiment, the isocyanate resin comprises from about 25 weight percent to about 35 weight percent of the two-component base resin mixture. In yet another embodiment, the isocyanate resin comprises about 30.5 weight percent of the two-component base resin mixture.

In addition to the two-component base resin mixture, the low-gloss, two-component clear coat 30 further comprises a silica-based flattener. In one embodiment, the silica-based flattener comprises any silica-based material or a combination of silica-based materials that lower the gloss of the low-gloss, two-component clear coat 30 to a 60° gloss finish within a range from 22 gloss units to 34 gloss units when cured. For example, in one embodiment, the silica-based flattener comprise any commercially available silica including, but not limited to, thermally derived silicas, precipitated silicas, surface treated silicas, wax treated amorphous silicas, organically treated amorphous silicas, pyrogenic surface modified silicas, hydrophobic silicas or combinations thereof. In one exemplary embodiment, the silica-based flattener comprises a pyrogenic surface modified silica. The low-gloss, two-component clear coat 30 can comprise any amount of the silica-based flattener that provides a low-gloss finish (i.e., a 60° gloss finish of 22 gloss units to 34 gloss units) when cured. For example, in one embodiment, the silica-based flattener is present in an amount from about 5 parts by weight per 100 parts by weight of the two-component base resin mixture to about 20 parts by weight per 100 parts by weight of the two-component base resin mixture. In an alternative embodiment, the silica-based flattener may be present in an amount from about 10 parts by weight per 100 parts by weight of the two-component base resin mixture to about 15 parts by weight per 100 parts by weight of the two-component base resin mixture. In yet another alternative embodiment, the silica-based flattener is added to comprise about 12.5 parts by weight per 100 parts by weight of the two-component base resin mixture.

The silica-based flattener can be incorporated into the low-gloss, two-component clear coat 30 in a variety of methods. In one embodiment, the silica-based flattener is mixed with the base resin prior to the base resin being combined with the isocyanate resin (i.e., prior to forming the two-component base resin mixture). In another embodiment, the silica-based flattener is mixed into the low-gloss, two-component clear coat 30 after the base resin and the isocyanate resin have been combined (i.e., after the two-component base resin mixture is formed). In yet another embodiment, the silica-based flattener is mixed into the low-gloss, two-component clear coat 30 as the two-component base resin mixture is being formed (i.e., as the base resin and the isocyanate resin are being combined).

In other embodiments, the low-gloss, two-component clear coat 30 further comprises other additives to adjust one or more physical properties of the low-gloss, two-component clear coat 30. For example, other additives may influence the life of the low-gloss, two-component clear coat 30, the stability of the low-gloss, two-component clear coat 30, the manufacturability of the low-gloss, two-component clear coat 30, the cost of the low-gloss, two-component clear coat 30 and/or other properties that influence the suitability of the low-gloss, two-component clear coat 30 for a particular application. Examples of other additives can include, without limitation, UV agents, softening agents, metallic enhancing agents, surface treatments or any other additive than affects one or more physical properties of the low-gloss, two-component clear coat 30.

Still referring to FIG. 1, the low-gloss, two coat paint system 100 further comprises a basecoat 20 which is protected from weathering, abrasions, or other environmental conditions by the low-gloss, two-component clear coat 30. The basecoat 20 can comprise any paint formulation that is suitable for use on a vehicle part or other article of manufacture. For example, the basecoat 20 itself may comprise various visual and physical characteristics such as color, gloss, weatherability, durability and/or other traits that influence its potential life and suitability for particular applications. In one embodiment, the basecoat 20 comprises any paint formulation that includes a variety of elements that individually influence one or more of the physical and/or visual characteristics of the base coat. For example, in one embodiment, the basecoat 20 comprises various resins and/or solvents. In an alternative embodiment, the basecoat 20 further comprises one or more additives such as pigments and/or metallic flakes to obtain a basecoat 20 with a desired color or appearance. In yet another embodiment, the basecoat 20 includes other components that influence the life of the basecoat 20, the stability of the basecoat 20, the manufacturability of the basecoat 20, the cost of the basecoat 20 and/or other properties that influence the suitability of the basecoat 20 for a particular application.

Still referring to FIG. 1, the low-gloss, two coat paint system 100 (comprising the low-gloss, two-component clear coat 30 and the basecoat 20) is be applied on a vehicle part 10. The vehicle part comprises any part of a vehicle which requires a painted surface. For example, in one embodiment, a vehicle part 10 comprises a door, hood, trunk, or any other exterior part of a vehicle. Accordingly, it should be understood that the painting system provides a low-gloss finish to the vehicle part 10 in conjunction with weathering performance and durability.

In another embodiment, the low-gloss, two coat paint system 100 may be applied to any other article of manufacture. The article of manufacture can comprise any part, component, device or the like that is machined, assembled or otherwise created by a manufacturer. Articles of manufacture can include, for example, vehicle accessories, construction equipment, toys, models, or any other article to which a low-gloss two-component coating may be applied.

Figure 2:
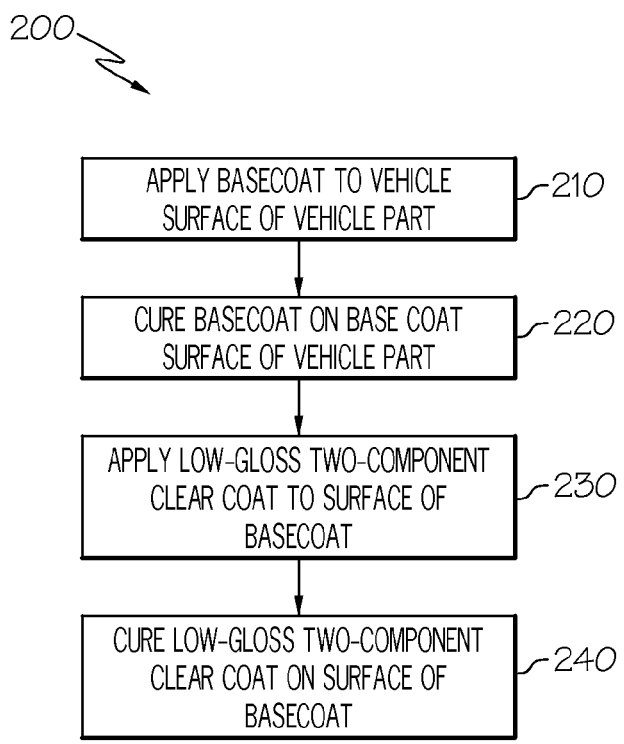
FIG. 2 depicts a flow diagram of a method for applying a low-gloss, two coat paint system according to one or more embodiments shown and described herein.

Referring now to FIGS. 1 and 2, the low-gloss, two coat paint system 100 is applied to a vehicle part 10 (or any other article of manufacture) by applying the basecoat 20 to a vehicle surface 11 of a vehicle part 10 in step 210. The basecoat 20 can be applied in any manner to cover the vehicle surface 11 of the vehicle part 10 with the basecoat 20. For example, the basecoat 20 can be applied to the vehicle surface 11 with spray guns, brushes, submersion or any similar manner of deposition, either alone or in combination. After the basecoat 20 is applied to the vehicle surface 11 of the vehicle part 10 in step 210, the basecoat 20 is cured on the vehicle surface 11 of the vehicle part 10 in step 220. Curing comprises any methodology to allow the basecoat 20 to set such that the basecoat 20 does not shift or deform due to gravity, physical contact or the like. In one embodiment, curing takes place at room temperature in standard atmospheric conditions. Alternatively, the basecoat 20 may be cured on the vehicle surface 11 of the vehicle part 10 in step 220 at an elevated temperature (such as, for example, via heat lamps), with controlled atmospheric conditions (such as, for example, an inert atmosphere), and/or with other environmental assistance (such as, for example, fans or blowers).

After the basecoat is cured on the vehicle surface 11 of the vehicle part 10 in step 220, the low-gloss, two-component clear coat 30 is applied to the basecoat surface 21 of the basecoat 20 in step 230. Similar to the application of the basecoat in step 210, the low-gloss, two-component clear coat 30 can be applied in any manner to cover the basecoat surface 21 of the basecoat 20 with the low-gloss, two-component clear coat 30, such as, for example, with spray guns, brushes, submersion or the like. Furthermore, the low-gloss, two-component clear coat 30 may be applied in any thickness relative to the thickness of the basecoat 20. For example, the layer of the low-gloss, two-component clear coat 30 may be less thick, more thick or substantially as thick as the layer of the basecoat 20. After the low-gloss, two-component clear coat 30 is applied to the basecoat surface 21 of the basecoat 20 in step 230, the low-gloss, two-component clear coat 30 is cured on the basecoat surface 21 of the basecoat 20 in step 240. Similar to curing the basecoat 20 in step 220, the low-gloss, two-component clear coat 30 may be cured in step 240 using any methodology to allow the low-gloss, two-component clear coat 30 to set such that the low-gloss, two-component clear coat 30 does not shift or deform due to gravity, physical contact or the like. In one embodiment, the curing of the low-gloss, two-component clear coat 30 in step 240 comprises the same curing process used for curing the basecoat 20 in step 220. In an alternative embodiment, the curing of the low-gloss, two-component clear coat 30 in step 240 may comprise a different curing process from that used for curing the basecoat 20 in step 220.

It should also be appreciated that any other steps may additionally be employed throughout the application method 200 to apply a low-gloss, two coat paint system 100 to a vehicle part 10. For example, in one embodiment, two coats of the basecoat 20 are applied to the vehicle part 10 prior to applying the low-gloss, two-component clear coat 30. In another embodiment, to coats of low-gloss, two-component clear coat 30 are applied to the basecoat 20. In yet another embodiment, additional surface treatment steps are employed to clean, dry or otherwise prepare a surface set to receive the basecoat 20 or the low-gloss, two-component clear coat 30.

EXAMPLE

A low-gloss, two-component clear coat was examined for gloss level, weatherability and overall performance. The two-component base resin mixture comprised an isocyanate resin and a base resin comprising urethane resin and acrylic resin. The urethane resin comprised a saturated linear polyester urethane resin in an amount of about 27.8 weight percent of the two-component base resin mixture. The acrylic resin comprised about 41.7 weight percent of the two-component base resin mixture. The isocyanate resin comprised about 30.5 weight percent of the two-component base resin mixture. In addition, the low-gloss, two-component clear coat comprised about 12.49 parts by weight of silica-based flattener per 100 parts by weight of the two-component base resin mixture. The silica-based flattener was added to the base resin (i.e., the mixture of the urethane resin and the acrylic resin) prior to mixing the base resin with the isocyanate resin. The mixture of the base resin (i.e., the urethane resin and the acrylic resin) and the silica-based flattener was then mixed with the isocyanate resin immediately prior to application of the low-gloss, two-component clear coat.

The initial 60° gloss finish (i.e., "Initial Gloss") was measured to be 32.4 gloss units and the sample was found to have complete adhesion (i.e., no chipping or peeling from the surface) after ten days submerged in water. The sample was also subjected to an accelerated weatherometer comprising a xenon light source of 500 mega joules (MJ) and outdoor real-time weathering. Following the weathering simulation and testing, the final 60° gloss finish was measured (i.e., "Final Gloss"). The Final Gloss Retention was then determined by dividing the Final Gloss by the Initial Gloss as an indicator of the weathering performance for each sample.

After 633 hours and 800 hours of accelerated weathering, the sample was measured to have a Final Gloss of 30.0 gloss units providing a Final Gloss Retention of 92.6 percent. Moreover, after 12 months of real-time (i.e., not accelerated or simulated) outdoor weathering, the sample was measured to have a Final Gloss of 29.0 gloss units providing a Final Gloss Retention of 89.5 percent. The sample did not display any cracking, peeling or any other indicators of lack of adhesion after both accelerated weathering and real-time weathering.

It should now be appreciated that low-gloss, two-component clear coats described herein may be applied to basecoats on vehicle parts or other articles of manufacture to provide a low-gloss finish and increased weatherability. By incorporating urethane resin into the base resin of the two-component base resin mixture, the silica-based flattener is carried and distributed throughout the low-gloss, two-component clear coat without the addition of dispersants, cross-linkers and/or other similar additives. In addition, by providing the low-gloss, two-component clear coat as two separate components prior to mixing (i.e., the base resin and the isocyanate resin) both individual components can be stored without premature curing which in turn provides increased performance upon application. Further, the low-gloss, two-component clear coats described herein provide additional protection and durability to the appearance of a vehicle or other article of manufacture to which the coating is applied while still providing a low-gloss finish.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A low-gloss, two coat paint system comprising a colored basecoat and a low-gloss, two-component clear coat, wherein the low-gloss, two-component clear coat comprises:
    a base resin comprising a urethane resin, wherein the base resin does not substantially include an additional cross-linker or dispersant;
    an isocyanate resin that combines with the base resin immediately prior to application of the low-gloss, two-component clear coat to form a two-component base resin mixture, wherein the two-component base resin mixture comprises from about 25 weight percent to about 30 weight percent urethane resin and from about 25 weight percent to about 35 weight percent isocyanate resin; and
    a silica-based flattener, wherein the silica-based flattener comprises from about 10 parts by weight per 100 parts by weight of the two-component base resin mixture to about 15 parts by weight per 100 parts by weight of the two-component base resin mixture, wherein the low-gloss, two-component clear coat has a 60° gloss finish from 22 gloss units to 34 gloss units when cured.

2. The low-gloss, two coat paint system of claim 1, wherein the urethane resin comprises a saturated linear polyester urethane.

3. The low-gloss, two coat paint system of claim 1, wherein the silica-based flattener is selected from the list consisting of thermally derived silicas, precipitated silicas, surface treated silicas, wax treated amorphous silicas, organically treated amorphous silicas, pyrogenic surface modified silicas, hydrophobic silicas and combinations thereof.

4. The low-gloss, two coat paint system of claim 3, wherein the silica-based flattener is a pyrogenic surface modified silica.

5. The low-gloss, two coat paint system of claim 3, wherein the two-component base resin mixture comprises about 12.5 parts by weight pyrogenic surface modified silica per 100 parts by weight of the two-component base resin mixture.

6. The low-gloss, two coat paint system of claim 1, wherein the two-component base resin mixture comprises about 27.8 weight percent urethane resin.

7. The low-gloss, two coat paint system of claim 1, wherein the base resin further comprises polyester resins, acrylic resins, methacrylate resins, alkyd resins, urethane resins, polycarbonate resins or combinations thereof.

8. The low-gloss, two coat paint system of claim 1, wherein the base resin further comprises an acrylic resin and the two-component base resin mixture comprises from about 35 weight percent to about 45 weight percent of the acrylic resin.

9. The low-gloss, two coat paint system of claim 1, wherein the base resin further comprises an acrylic resin the two-component base resin mixture comprises about 41.7 weight percent of the acrylic resin.

10. The low-gloss, two coat paint system of claim 1, wherein the two-component base resin mixture comprises about 30.5 weight percent urethane resin.

11. An article of manufacture having a low-gloss, two-component clear coat, the article of manufacture comprising:
    an article of manufacture surface;
    a colored basecoat applied to the article of manufacture surface;
    a low-gloss, two-component clear coat applied to a surface of the colored basecoat, wherein the low-gloss, two-component clear coat comprises:

a base resin comprising a urethane resin, wherein the base resin does not substantially include an additional cross-linker or dispersant;

an isocyanate resin that combines with the base resin immediately prior to application of the low-gloss, two-component clear coat to form a two-component base resin mixture, wherein the two-component base resin mixture comprises from about 25 weight percent to about 30 weight percent urethane resin and from about 25 weight percent to about 35 weight percent isocyanate resin; and a silica-based flattener, wherein the silica-based flattener comprises from 10 parts by weight per 100 parts by weight of the two-component base resin mixture to 15 parts by weight per 100 parts by weight of the two-component base resin mixture, wherein the low-gloss, two-component clear coat has a 60° gloss finish from 22 gloss units to 34 gloss units when cured.

12. The article of manufacture of claim 11, wherein the urethane resin comprises a saturated linear polyester urethane.

13. The article of manufacture of claim 12, wherein the two-component base resin mixture comprises about 27.8 weight percent saturated linear polyester urethane.

14. A method for applying a low-gloss, two coat paint system, the method comprising:
applying a colored basecoat to a vehicle part;
curing the basecoat on the vehicle part;
applying a low-gloss, two-component clear coat to a basecoat surface of the colored basecoat, wherein the low-gloss, two-component clear coat comprises:

a base resin comprising a urethane resin, wherein the base resin does not substantially include an additional cross-linker or dispersant;

an isocyanate resin that combines with the base resin immediately prior to application of the low-gloss, two-component clear coat to form a two-component base resin mixture, wherein the two-component base resin mixture comprises from about 25 weight percent to 30 weight percent urethane resin and from about 25 weight percent to about 35 weight percent isocyanate resin; and a silica-based flattener comprising from about 10 parts by weight per 100 parts by weight of the two-component base resin mixture to about 15 parts by weight per 100 parts by weight of the two-component base resin mixture and;

curing the low-gloss, two-component clear coat on the basecoat surface of the colored basecoat, wherein the low-gloss, two-component clear coat comprises a 60° gloss finish of 22 units to 34 units after curing.

15. The method of claim 14, wherein the urethane resin comprises a saturated linear polyester urethane.

16. The method of claim 14, wherein the silica-based flattener is selected from the list consisting of thermally derived silicas, precipitated silicas, surface treated silicas, wax treated amorphous silicas, organically treated amorphous silicas, pyrogenic surface modified silicas, hydrophobic silicas and combinations thereof.

* * * * *